(12) United States Patent
Howkins et al.

(10) Patent No.: US 6,932,458 B2
(45) Date of Patent: Aug. 23, 2005

(54) OBTAINING HIGH FREQUENCY PERFORMANCE BY CONTROLLING CHAMBER PRESSURE

(75) Inventors: Stuart D. Howkins, Ridgefield, CT (US); Charles A. Willus, Newtown, CT (US)

(73) Assignee: Ricoh Printing Systems America, Inc., Simi Valley, CA (US)

(*) Notice: Subject to any disclaimer, the term of this patent is extended or adjusted under 35 U.S.C. 154(b) by 0 days.

(21) Appl. No.: 10/303,443

(22) Filed: Nov. 25, 2002

(65) Prior Publication Data

US 2004/0100528 A1 May 27, 2004

(51) Int. Cl.⁷ ................................................ B41J 2/16
(52) U.S. Cl. ...................................................... 347/47
(58) Field of Search ................................ 347/47, 44, 42, 347/41, 40, 29, 26, 20, 9, 7, 5, 68, 69, 70, 71, 72

(56) References Cited

U.S. PATENT DOCUMENTS

2004/0041872 A1 * 3/2004 Davis et al. .................. 347/23

* cited by examiner

Primary Examiner—Raquel Y. Gordon
(74) Attorney, Agent, or Firm—Pillsbury Winthrop Shaw Pittman LLP

(57) ABSTRACT

A method and apparatus to prevent ink starvation includes keeping ink in a primary common reservoir at a high pressure. The ink is transferred from the primary common reservoir to a local reservoir when a pressure drop across a restrictor decreases pressure in the local reservoir. The pressure drop across a restrictor results from a higher ink flow rate due to rapid firing of the transducer.

48 Claims, 6 Drawing Sheets

OBTAINING HIGH FREQUENCY PERFORMANCE BY CONTROLLING CHAMBER PRESSURE

BACKGROUND OF THE INVENTION

A. Field of the Invention

This invention relates to improving the performance of ink jet print heads in high frequency usage conditions.

B. Description of Prior Art

Under high-frequency firing conditions, ink jet print heads generally experience higher failure rates. There is also a limiting frequency beyond which the ink jets will not fire. Experiments and theory have shown that many of these failures occur from continued motion of the ink in the ink chamber and the ink meniscus of the orifice after the firing of the print head. When the frequency of firing becomes higher, the meniscus does not have time to settle back to equilibrium before the next firing pulse. The motion is caused by the continued "ringing" associated with resonances in the ink jet. These resonances include the resonance of the piezo electric transducer driving element and fluidic resonances in the ink such as the Helmholtz resonance mode and acoustic modes.

One way to minimize the ringing or resonance of the fluid is to decrease the size of the restrictor to dampen the Helmholtz resonance. However, decreasing the size of the restrictor too much may lead to ink starvation. Starvation failure occurs when the mean orifice pressure becomes more negative and, when combined with a transient negative pressure at firing, overcomes the surface tension strength of the meniscus so that air is drawn into the ink chamber.

One way to avoid starvation failure is to apply air pressure above the ink in the reservoir. However, under positive pressure (hydrostatic head), when the jets are not running, ink starts to weep out of the orifices. The surface tension of the meniscus tends to prevent weeping of the ink and the amount of positive pressure that can be held back depends on the size of the orifices. For the size of the orifices typically used in ink jet heads, the pressure cannot be increased beyond about two inches of water when the jets are not running before the ink starts to weep out of the orifices. When the jets are started and the frequency increased, the hydrostatic head can be increased without ink weeping out onto the outside of the orifice plate. For example, in one experimental laboratory embodiment, pressure was increased up to +20 inches of water when the jets were running at 20 kilohertz. (It is common to refer to the increase or decrease of pressure within the ink jet chamber as being an increase or decrease in inches of water. In many cases the density of the ink or other liquid is close to the density of water so the hydrostatic head is about the same. Other units of pressure commonly used are the pascal and the bar. One inch of water is approximately 249 pascals or $2.49 \times 10^{-3}$ bars.) In ink jet print heads, the pressure within the ink jet chamber may be varied by the level of ink or other liquid located within the ink jet reservoir above or below the level of ink or other liquid located within the ink jet chamber—i.e. the hydrostatic "head" of ink. In this embodiment, the use of smaller restrictors and high positive pressure allowed the running of the jets up to the piezoelectric driver resonant frequency, which in this experiment, was 42 kilohertz. Thus, a need exists to allow high frequency operation of the print head without weeping or ink starvation.

DETAILED DESCRIPTION

Figure 1:
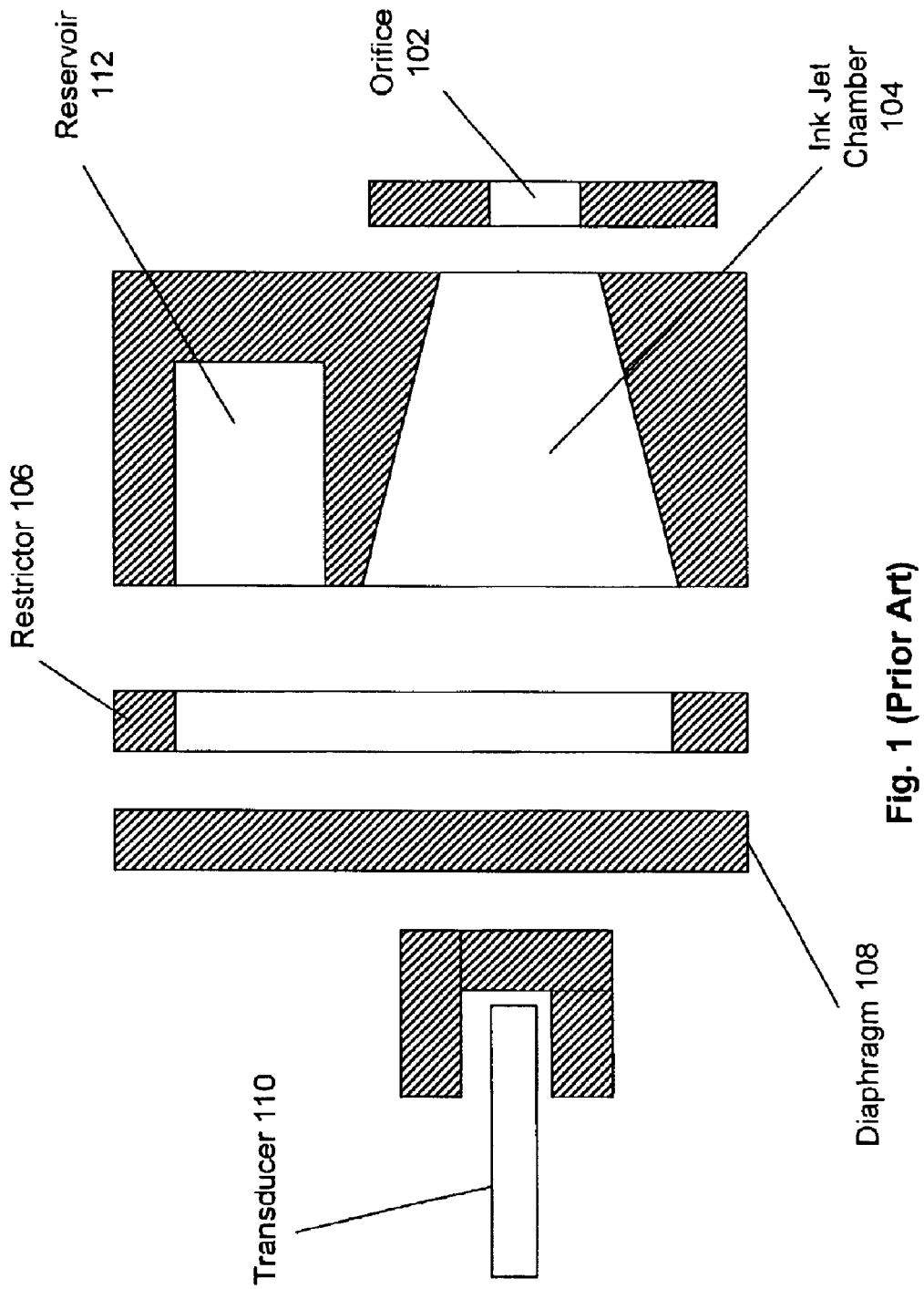
FIG. 1 illustrates a standard ink jet print head as is available in the prior art.

The ink jet apparatus may include a print head, an ink jet reservoir, and other peripheral apparatus. The print head may include a restrictor member which includes a plurality of individual restrictors, a chamber member including a plurality of individual ink jet chambers, and an orifice member including a plurality of individual ink droplet ejection orifices. The print head may also include a diaphragm member and a transducer member. In embodiments of the invention, the ink manifold, the restrictor member, the chamber member, the orifice member, the diaphragm member, and the transducer member are configured in plates bonded together to form the print head. FIG. 1 illustrates a standard ink jet print head as is available in the prior art. When constructed, the print head may form plural ink jet devices, each ink jet device having an orifice 102, an ink jet chamber 104, a restrictor 106, a diaphragm 108, and a transducer 110. The ink jet print head of the present invention may dampen meniscus oscillations by using a small restrictor 106 and overcome ink starvation by applying an increased hydrostatic pressure to the ink as required. In other embodiments of the invention, the print head may only include an orifice 102, an ink jet chamber 104, a restrictor 106, a diaphragm 108, and a transducer 110.

In one embodiment of the present invention, the ink jet print head may include a common ink reservoir 112 to contain ink, a restrictor member including a plurality of individual restrictors 106, a chamber member including a plurality of ink jet chambers 104, an orifice member including a plurality of individual ink droplet ejection orifices 102, a transducer member including a plurality of transducers 110, a diaphragm member including a plurality of diaphragms 108, a local reservoir member including a plurality of local reservoirs (not shown) for containing ink, a plurality of valves (not shown), a plurality of pressure sensors (not shown), and a plurality of controllers (not shown). In other embodiments of the present invention, the ink jet print head may include a plurality of check valves (not shown). In other embodiments of the present invention, the ink jet print head may include a displacement device member including a plurality of displacement devices(not shown). In embodiments of the invention, the ink jet print head may include a valve, a bleed valve, a pressure sensor, a controller, a check valve, and a displacement device.

In an embodiment of the present invention, the common reservoir member, the restrictor member, the chamber member, the transducer member, the orifice member, and the diaphragm member are configured in plates that are bonded together to form the print head. Additionally, the local reservoir member may be bonded to the above-mentioned members to form the ink-jet print head. In additional embodiments, the pressure device member may be bonded to the above-mentioned members to form the ink jet print head. In other embodiments of the present invention, the common reservoir member may not be bonded together with the above-mentioned members in order to form the ink jet print head.

The invention may be applied in many different applications where a liquid which is not necessarily an ink, may be jetted from a print head device. For example, the liquid may be a polymer, a metal, a plastic, a wax, anything that is a liquid or can be liquefied e.g. by heating. The above list is only a representative list and should not be construed as limiting, in that embodiments of the invention may be applied to any substance that is jetted from a print head device. In other embodiments of the invention, the ink jet print head may eject an ultraviolet (UV) radiation curable substance or other substances which may solidify to form a layer of appreciable thickness. These substances may be utilized in three-dimensional modeling. Three-dimensional modeling involves building the model from many "printed" layers. Hence, three-dimensional modeling requires many jetted droplets and, therefore, may be a slow process. High-frequency jetting, described in this invention, may decrease the time for three-dimensional modeling.

In embodiments of the invention, the ink jet print head may eject an etching substance in a metered fashion to etch out a printed circuit board or a semiconductor integrated circuit chip. In other embodiments of this invention, the ink jet print head may be used as a micro-metering device for any liquid that needs to be metered accurately especially in very small quantities. Again, the above-mentioned embodiments are only representative examples of uses of an ink jet print head and should not be construed as limiting. Embodiments of the present invention may be utilized in any application where a substance is jetted from a print head onto another surface.

Figure 2:
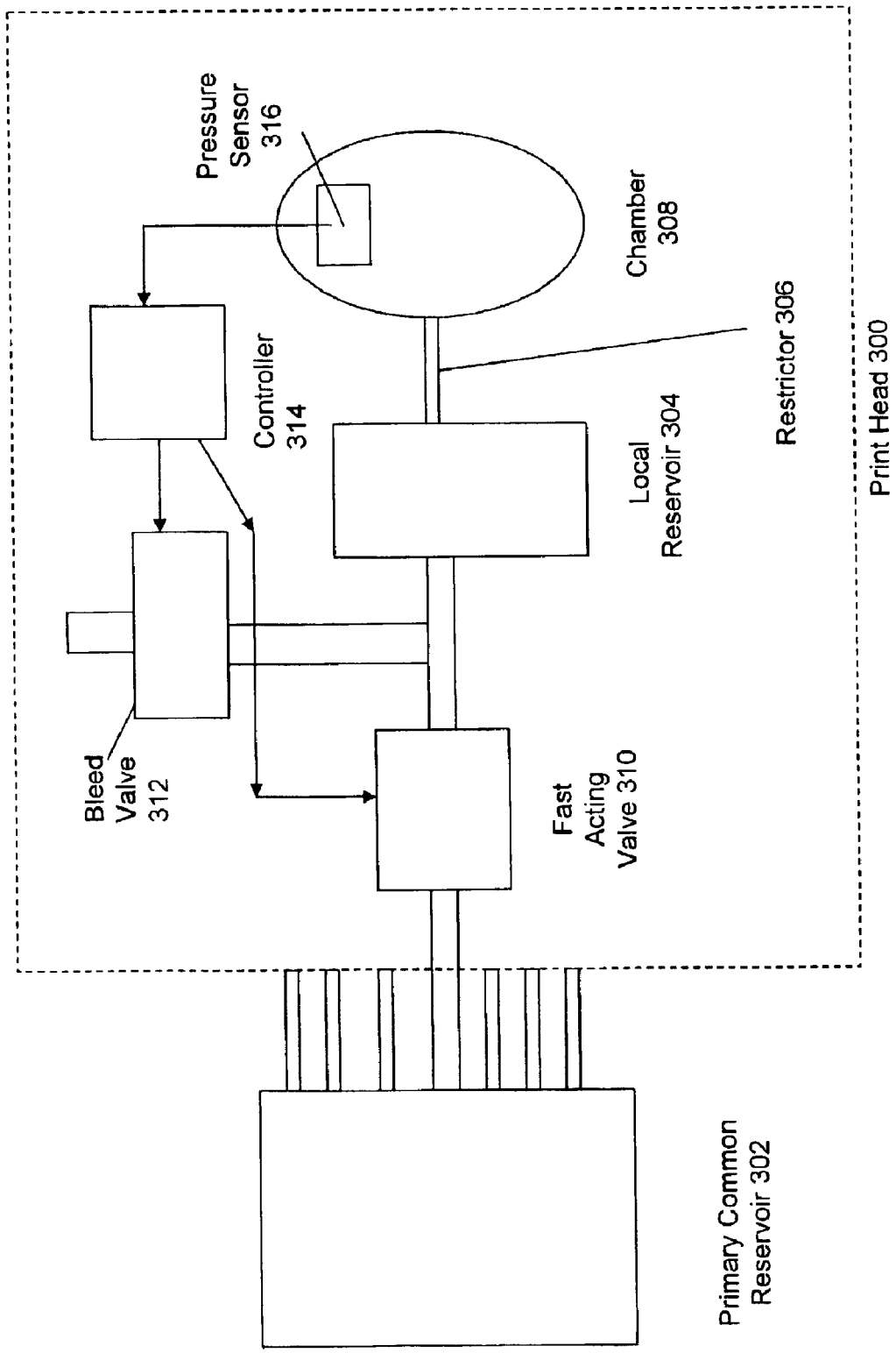
FIG. 2 illustrates an ink jet print head according to an embodiment of the present invention.

FIG. 2 illustrates an ink jet print head according to an embodiment of the present invention. When constructed, the print head may form a plurality of ink jet devices, and each ink jet device 300 may include an orifice (not shown), an ink jet chamber 308, a restrictor 306, a diaphragm (not shown), a transducer (not shown), and a local reservoir 304. In other embodiments, the ink jet print head may include a single orifice, a single ink jet chamber 308, a single restrictor 306, a single diaphragm, a single transducer, and a single local reservoir 304. In embodiments including a plurality of ink jet devices 300, each of the ink jet devices 300 may include at least one valve for connecting and disconnecting to a primary common reservoir 302 and/or for venting the ambient pressure from the ink jet chamber 308. In an embodiment of the present invention including a plurality of ink jet devices 300, each of the ink jet devices 300 may include a displacement device (not shown). Each of the ink jet devices 300 may operate to selectively eject droplets of ink from the ink jet chamber 308 through the ink droplet ejection orifice, in response to the selective energization of the transducer, which pushes against the diaphragm.

As illustrated in FIG. 2, the primary common reservoir 302 may define a hollow interior for containing ink for all the plurality of ink jet devices 300. The primary common reservoir 302 may be located in the reservoir member (not shown), which may be located inside the print head. Alternatively, the primary common reservoir 302 may be located outside the print head. The primary common reservoir 302 may be in flow communication, through the local reservoir 304 and the restrictor 306, with each ink jet chamber 308. Although a plurality of ink jet devices 300 may exist for in the ink jet print head, for simplicity, only one is illustrated in FIG. 2.

In a single ink jet device in an ink jet print head 300, a local reservoir 304 may receive ink from the primary reservoir 302. In an embodiment of the invention, the primary reservoir 302 may be placed at a higher hydrostatic pressure than the local reservoir 304. This configuration may be needed in order to prevent ink starvation, i.e., not enough ink making it into the ink jet chamber 308. The primary common reservoir 302 may maintain the high hydrostatic pressure by placing a controllable valve (310 and 312) between the primary common reservoir 302 and the local reservoir 304. In embodiments of the invention, the controllable value may include a valve 310 and a bleed valve 312. The controllable valve may be one physical device or may be two separate valve devices. The valve 310, when opened or in an open position, may allow the primary common reservoir 302, which remains at a relatively high hydrostatic pressure, to increase the pressure in the local reservoir 304 and adjust it to the pressure needed according to the printing frequency. The valve 310 may be a piezo-electrically switched valve.

Illustratively, during a time period that includes the rapid firing of the transducer, the valve 310 may be opened between the primary reservoir 302 and the local reservoir 304 allowing the pressure of the local reservoir 304, and thus the ink jet chamber 308, to increase. By controlling the pressure in the local reservoir 304 in this way, the mean pressure in the ink chamber 308 is held constant. Controlled pressure variations in the local reservoir 304 may compensate for the flow pressure drop across the restrictor 306. After this occurs, the closing of the valve 310 may also prevent weeping.

The bleed valve 312 may allow the dissipating of pressure from the local reservoir 304 and hence the ink jet chamber 308 when the valve 310 is closed. Conversely, when the transducer (not shown) is not fired or is not fired rapidly, the bleed valve 312 may bleed off the excess pressure of the ink jet chamber 308 in order to return the pressure in the ink jet chamber 308 to ambient pressure. The excess pressure may be bled off or dissipated off from the ink jet chamber 308. Ink bled off through the bleed valve 312 may be returned to the primary common reservoir 302 by means of a pump (not shown).

The opening and closing of the valve 310 and the bleed valve 312 may be determined by a controller 314 and a pressure sensor 316. The pressure sensor 316 may measure the pressure within the ink jet chamber 308 and, depending upon the reading, transmit a signal to the controller 314 to open the valve 310, open the bleed valve 312, or to open neither valve. For example, if the pressure sensor 316 determines the pressure in the ink jet chamber 308 is low, due to rapid firing of the transducer, the pressure sensor 316 may transmit a signal to the controller 314 to open the valve 310 to allow the higher pressure of the primary common reservoir 302 to be transferred to the local reservoir 304 and thus the ink jet chamber 308. Conversely, if the pressure sensor 316 determines the pressure in the ink jet chamber 308 is too high, then the pressure sensor 316 may transmit a signal to the controller 314 instructing it to open the bleed valve 312.

The primary common reservoir 302 may be placed at high pressure in a variety of manners. In one embodiment, air may be applied above the ink by a pressure-applying device (not shown) such as an elastic membrane. Illustratively, the valve 310 and the bleed valve 312 may be piezo-controlled.

In an alternative embodiment, the pressure sensor (not shown) may be located in the local reservoir 304. In this embodiment, the pressure sensor may identify when the pressure has changed within the local reservoir 304. The pressure sensor may transmit a signal to the controller 314 to open the valve 310 or to open the bleed valve 312, as described above. In this embodiment of the invention, the controller 314 may also need information on the firing rate of the transducer in order to decide whether to open the valve 310 or to open the bleed valve 312. A transducer firing rate determiner (not shown) may identify the firing rate of the transducer. For example, the transducer firing rate determiner may calculate the pressure drop across the restrictor 306 from the firing rate of the transducer and transmit this data to the controller 314. The pressure sensor may also transmit a signal to the controller 314 indicating the pressure in the local reservoir 304. From these two signals the controller 314 can compute the mean pressure in the ink jet chamber 308. In this embodiment, if the computed pressure is low due to the rapid firing of the transducer, the controller 314 may transmit a valve signal to the valve 310 to open and to the bleed valve 312 to close, and thus increase the pressure in the local reservoir 304 and the chamber 308. Conversely, if the controller 314 computes the pressure in the chamber 308 to be too high, it may transmit a valve signal to the valve 310 to close and to the bleed valve 312 to open, thus decreasing the pressure in the chamber 308.

Figure 3:
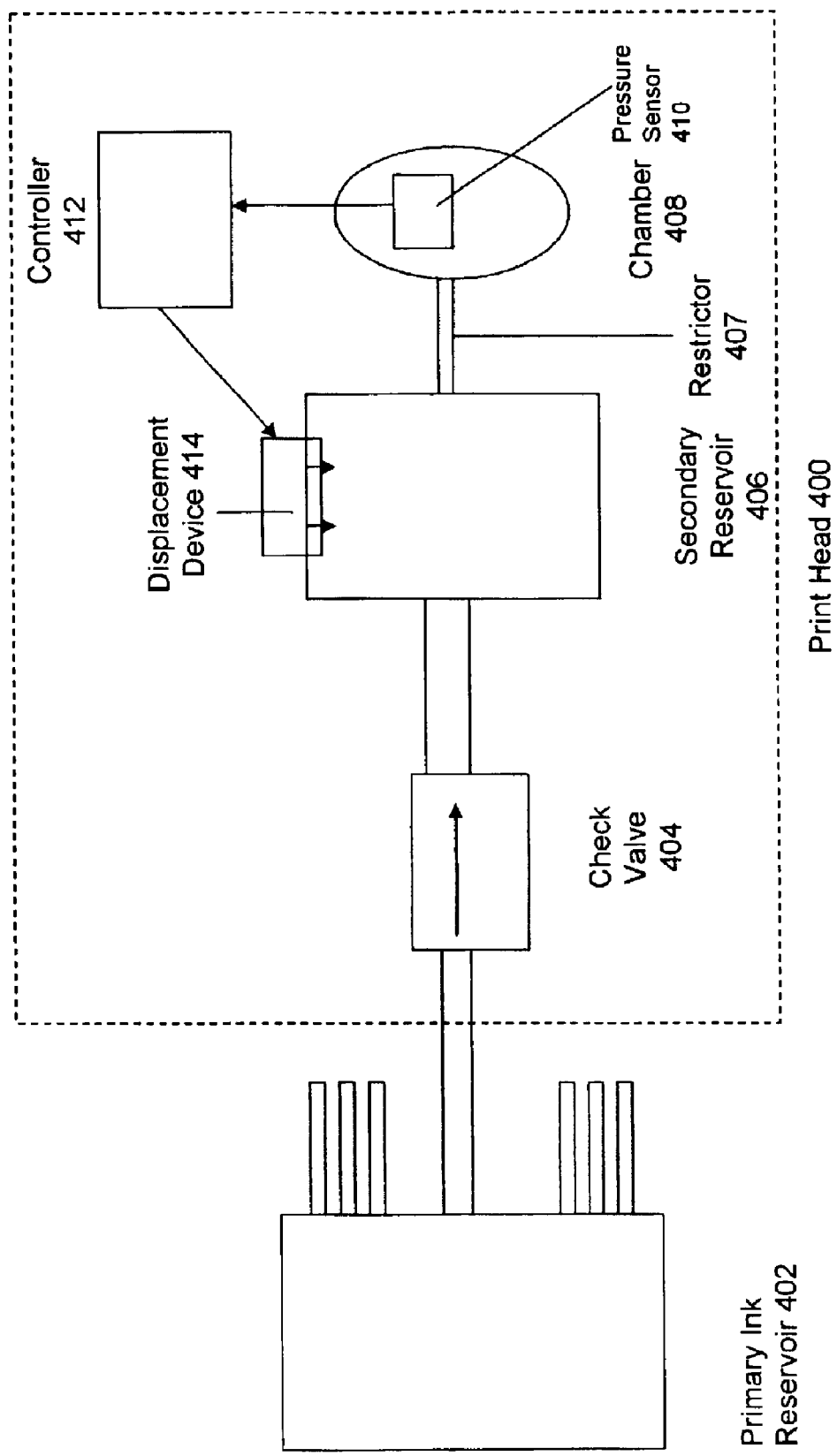
FIG. 3 illustrates an ink jet print head including a pressure-applying device according to an embodiment of the present invention.

FIG. 3 illustrates an ink jet print head including a displacement device according to an embodiment of the present invention. In another embodiment of the present invention, each ink jet device in the ink jet print head 400 may include a one-way check valve 404, a local reservoir 406, a restrictor 407, an ink jet chamber 408, a pressure sensor 410, a controller 412, and a displacement device 414. In an embodiment of the invention, a common primary reservoir 402 may also be included in the ink jet print head. In this embodiment, the ink in the primary common reservoir 402 may be placed at an ambient pressure or a pressure slightly below ambient pressure. The one-way check valve 404 may allow flow only in the direction from the primary common reservoir 402 to the local reservoir 406. In embodiments of the present invention, the pressure sensor 410 may be located within the ink jet chamber 408. The pressure sensor 410 may determine the pressure within the ink jet chamber and transmit a signal to the controller 412 indicating whether the pressure in ink jet chamber 408 is high or low. The controller 412 may receive the signal from the pressure sensor 410 and transmit a displacement signal to the displacement device 414 to displace in or out the local reservoir to increase or reduce pressure within the local reservoir 406.

Illustratively, the displacement device 414 may be a bimorph device. In another embodiment, the displacement device 414 may be any type of miniature pump, e.g., a piezo-electric operated pump, a piezo-electric bender, or a bubble chamber. In an exemplary embodiment of the present invention, the displacement device 414 may be placed in the local reservoir 406 if the displacement device's 414 size allows it. The displacement device 414 may press in on the secondary reservoir 406 if high pressure in the ink jet chamber 408 is needed because the pressure sensor 410 determined the pressure in the ink jet chamber 408 was too low. For example, the displacement device 414 may be activated at the same time the transducer is fired, slightly before the transducer is fired, or slightly after the transducer is fired.

Illustratively, if an increase in pressure is desired in the ink jet chamber 408, the displacement device 414 or a foot assembly (not shown) pushed by the displacement device 414 may press against a diaphragm (not shown) in an area corresponding to the local reservoir 406. The pushing of the displacement device 414 may depress the diaphragm, slightly decrease the size of the local reservoir 406, and thereby increase the hydrostatic pressure in the local reservoir 406. The pressure applied by the displacement device 414 in the local reservoir 406 may be at a level significantly lower than the instantaneous pressure applied by the piezo-electric driving transducer in the ink jet chamber 408 (generally around the level of 5–10 mm of water compared to a level of 1 atmosphere, i.e., several orders of magnitude lower). As discussed previously, the maintenance of the higher pressure in the local reservoir 406 may prevent ink starvation during a timeframe including when the transducer is firing.

In another embodiment of the present invention, the pressure sensor 410 may be located within the local reservoir 406. The pressure sensor 410 may determine the pressure in the local reservoir 406. The pressure sensor 410 may generate a signal and transmit the signal to a controller 412, which in turn transmits the displacement signal to the displacement device 414. The controller 412 may also receive a signal transmitted from a transducer firing rate determiner (not shown) in the ink jet chamber 408 indicating the rate of firing of the transducer. The firing rate determines the rate of ink flow through the restrictor 407 and hence the pressure drop across the restrictor 407. With the signal from the pressure sensor 410 and the signal from the transducer, the controller 412 may thus be able to compute the pressure in the ink jet chamber 408. Illustratively, if the controller 412 receives a rate signal that the transducer has been fired rapidly and if the controller 412 also receives a signal that the pressure of the ink in the local reservoir is low from the pressure sensor, the controller 412 may compute that the pressure in the ink jet chamber 408 is low and transmit a signal to the displacement device 414 to depress either the diaphragm or the foot to reduce the size of the local reservoir 406 and increase the flow, and thus pressure, in the local reservoir 406, the restrictor 407, and the ink jet chamber 408.

Figure 4:
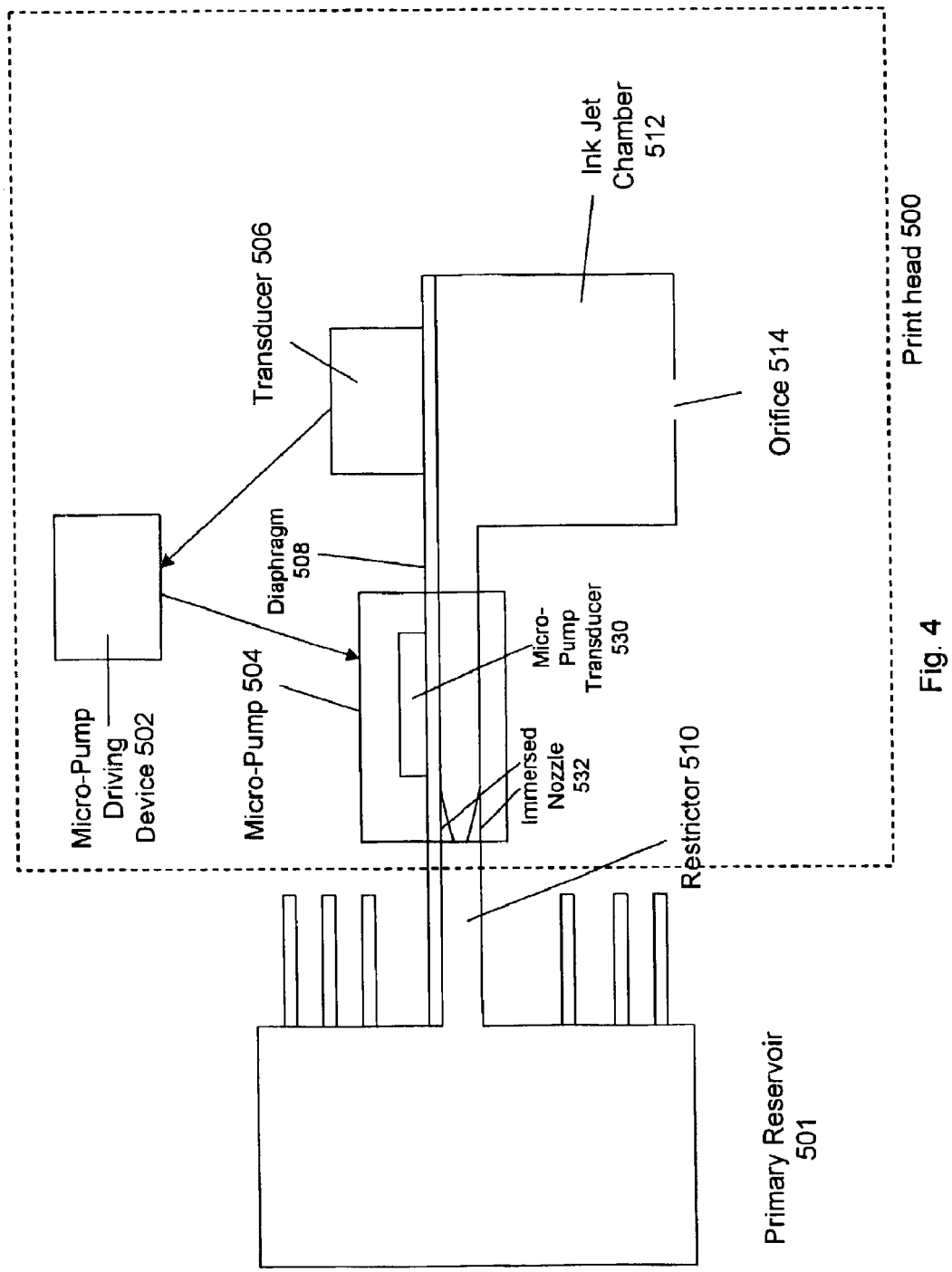
FIG. 4 illustrates an ink jet print head including a micro-pump device according to an embodiment of the present invention.

FIG. 4 illustrates an ink jet print head including a micro-pump device according to an embodiment of the present invention. In an embodiment of the present invention, the restrictor member, the chamber member, the transducer member, the orifice member, the diaphragm member, and the reservoir member may be configured in plates that are bonded together to form a print head. When constructed, the print head 500 may form a plurality of ink jet devices, with each ink jet device having an orifice 514, an ink jet chamber 512, a restrictor 510, a diaphragm 508, a transducer 506, a micro-pump 504, and a micro-pump driving device 502. In other embodiments of the invention, the print head may include a single orifice 514, a single ink jet chamber 512, a single restrictor 510, a single diaphragm 508, a single transducer 506, a single micro-pump 504, and a single micro-pump pumping device 502. The micro-pump 504 may include a micro-pump transducer 530 and a micro-pump immersed nozzle 532. The ink jet print head may also include a primary reservoir 501. As noted previously, the ink jet print head 500 operates to selectively eject droplets of ink from the ink jet chamber 512 through the orifice 514, in response to the selective energization of the transducer 506.

Figure 5:
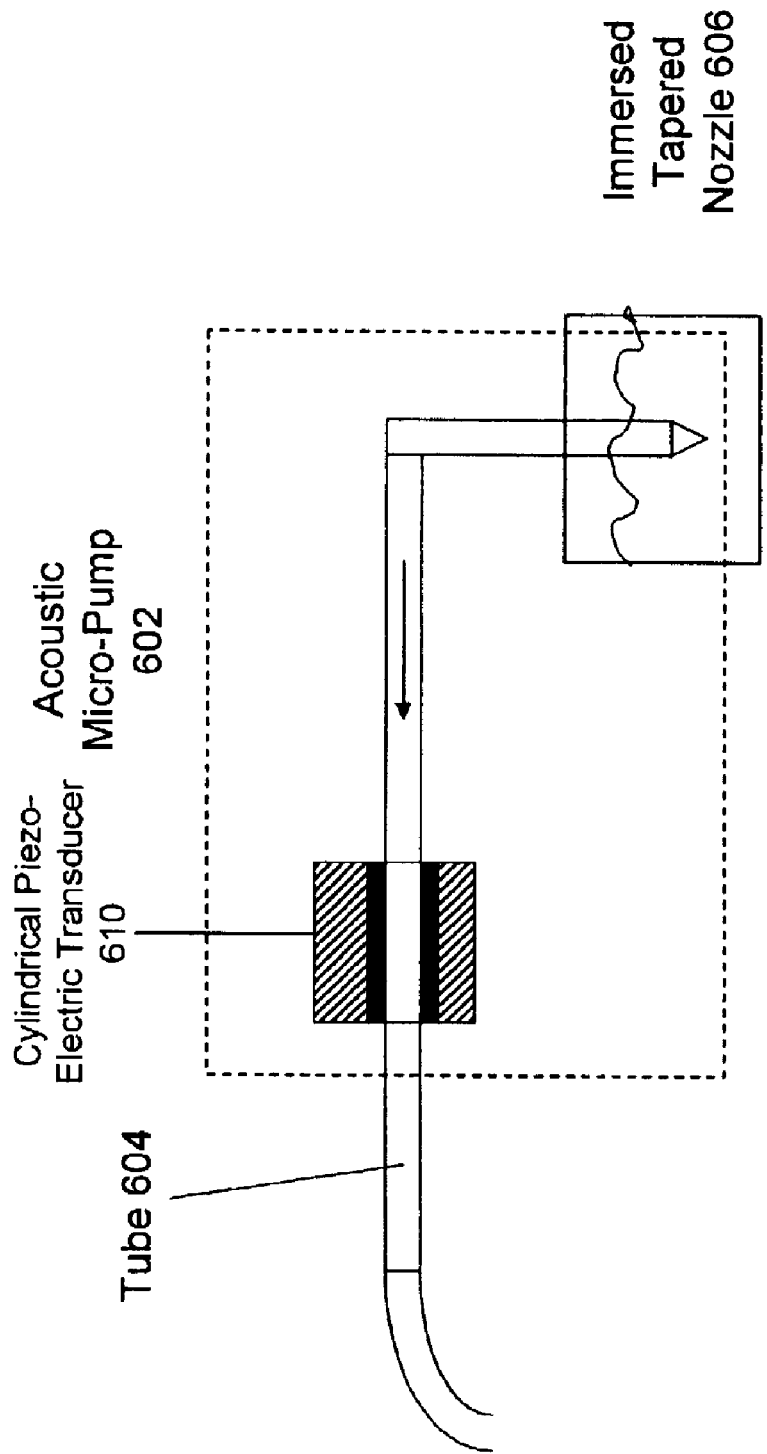
FIG. 5 illustrates the principle of the micro-pump action caused by high frequency pressure fluctuations adopted in an embodiment of the present invention.

The micro-pump driving device 502 may energize the micro-pump 504. The micro-pump 504 may be any type of pump that can be made small enough to pump ink through the restrictor 510. In one embodiment, the micro-pump 504 may be an acoustic pump, also referred to as an ultrasonic pump. The acoustic micro-pump 504 may comprise a piezo-electric transducer 530 attached to the diaphragm 508 and an immersed nozzle 532. In this embodiment, the micro-pump transducer 530 vibrates the diaphragm 508. By the micro-pump 504 vibrating the diaphragm 508, the diaphragm 508 may act upon the restrictor 510 in the presence of an immersed nozzle or choke 532, to create a pumping action. FIG. 5 illustrates the principle of an acoustic micro-pump vibration according to an embodiment of the present invention. In FIG. 5, an acoustic micro-pump is illustrated comprising a cylindrical piezo-electric transducer 610, which is disposed over a flexible thin tube 604 connected to a tube with an immersed and tapered nozzle 606. As the cylindrical piezo-electric transducer 610 is vibrated against the tube 604, the liquid is drawn through the immersed nozzle 606 through the tube 604 in the direction of the arrow.

Illustratively, the micro-pumping action of the micro-pump 504 may result from the micro-pump transducer 530 vibrating the diaphragm 508 against the restrictor 510, which in the presence of the immersed nozzle 532, may draw more ink from the primary reservoir 501 into the ink jet chamber 512. The addition of more ink into the ink jet chamber 512 may maintain the hydrostatic pressure within the ink jet chamber 512. The pressure created by the micro-pump 504 may be several orders of magnitude of pressure below the pressure applied by the transducer 506. However, generally, the small pressure created by the micro-pump 504 may be generated over a time period much longer than the duration of the pressure applied by the transducer 506.

The micro-pump 504 activation may be triggered in conjunction with the firing of the transducer 506. In one embodiment, the micro-pump 504 activation may be initiated each time the transducer 506 is fired. In this embodiment, the micro-pump 504 activation may be initiated at the same time the transducer 506 is fired, in advance of the transducer 506 firing, or after the transducer 506 has been fired. In another embodiment of the present invention, the micro-pump 504 may be activated after a certain number of transducer 506 firings. For example, the micro-pump 504 may be activated once for every three-transducer 506 firings. Conversely, the micro-pump 504 may be activated a specified number of times for each transducer firing, e.g., micro-pump 504 activated four times for each transducer 506 firing. In another embodiment, the duration of activation of the micro-pump 504 may be made dependent upon the rate of transducer 506 firings.

In an alternative embodiment of the present invention, the micro-pump 504 may continuously be activated, but the magnitude of the pumping action of the micro-pump 504 when the micro-pump 504 is activated may be varied depending on the frequency of the transducer 506 firing. Illustratively, if the transducer 506 fires four times, the magnitude of the pumping action of the micro-pump 504 may be greater by a predetermined factor than the magnitude of the micro-pump 504 pumping action if the transducer 506 was only fired one time. The increased magnitude of the micro-pump 504 pumping action may maintain the desired hydrostatic pressure within the ink jet chamber 512, which may prevent ink starvation.

In one embodiment of the present invention, the micro-pump driving device 502 may be an analog circuit which provides an output signal that corresponds to the frequency of transducer 506 firings. The micro-pump 504 may be activated after a certain output signal level is reached. For example, a simple resistor-capacitor (RC) circuit may be utilized as a micro-pump driving device 502. Each transducer 506 drive pulse may charge a capacitor in the RC circuit, in which the charge slowly leaks away over time. The voltage across the resistor in the RC circuit may increase with an increased number of transducer 506 drive pulses, i.e., an increased number of transducer 506 firings. If fewer drive pulses occur, the voltage across the resistor in the RC circuit may be smaller. The activation of the micro-pump 504 may be determined based on the voltage level across the resistor in the RC circuit. If the voltage level is higher than a specific threshold, indicating more frequent firing of the transducer 506, the micro-pump 504 may be activated or activated with a higher pumping action. Conversely, if the voltage level is low, indicating less frequent firing of the transducer 506, the micro-pump 504 may not be activated until the voltage level meets a threshold or may be activated with a decreased pumping action.

In an alternative embodiment, the micro-pump driving device 502 may be a digital circuit that outputs a signal to drive the activation of the micro-pump 504. The digital circuit may accept an input signal identifying that the transducer 506 has been fired. The digital circuit may include software or circuitry for an algorithm that determines when the micro-pump 504 may be activated or how energetically the micro-pump 504 may be activated. For example, as discussed previously, the software or circuitry may identify that the micro-pump 504 should be activated for every two firings of the transducer 506 or it may define a curve, or non-linear relationship, of micro-pump 504 pumping activity versus frequency. Once the software or circuitry determines when or how energetically the micro-pump 504 should be activated, an output signal is generated and sent to the micro-pump 504 to initiate or control activation.

In another embodiment of the present invention, a primary restrictor member, a secondary restrictor member, the chamber member, the transducer member, the orifice member, the diaphragm member, a primary reservoir member, and a secondary reservoir member are configured in plates that are bonded together to form a print head. In one embodiment of the invention, the primary reservoir member and the secondary reservoir member are configured in one plate. In another embodiment of the invention, the primary reservoir member and the secondary reservoir member may be configured in separate plates. In addition, in an embodiment including a separate plate for a primary reservoir member and a secondary reservoir member, the secondary restrictor member may require a separate restrictor plate.

Figure 6:
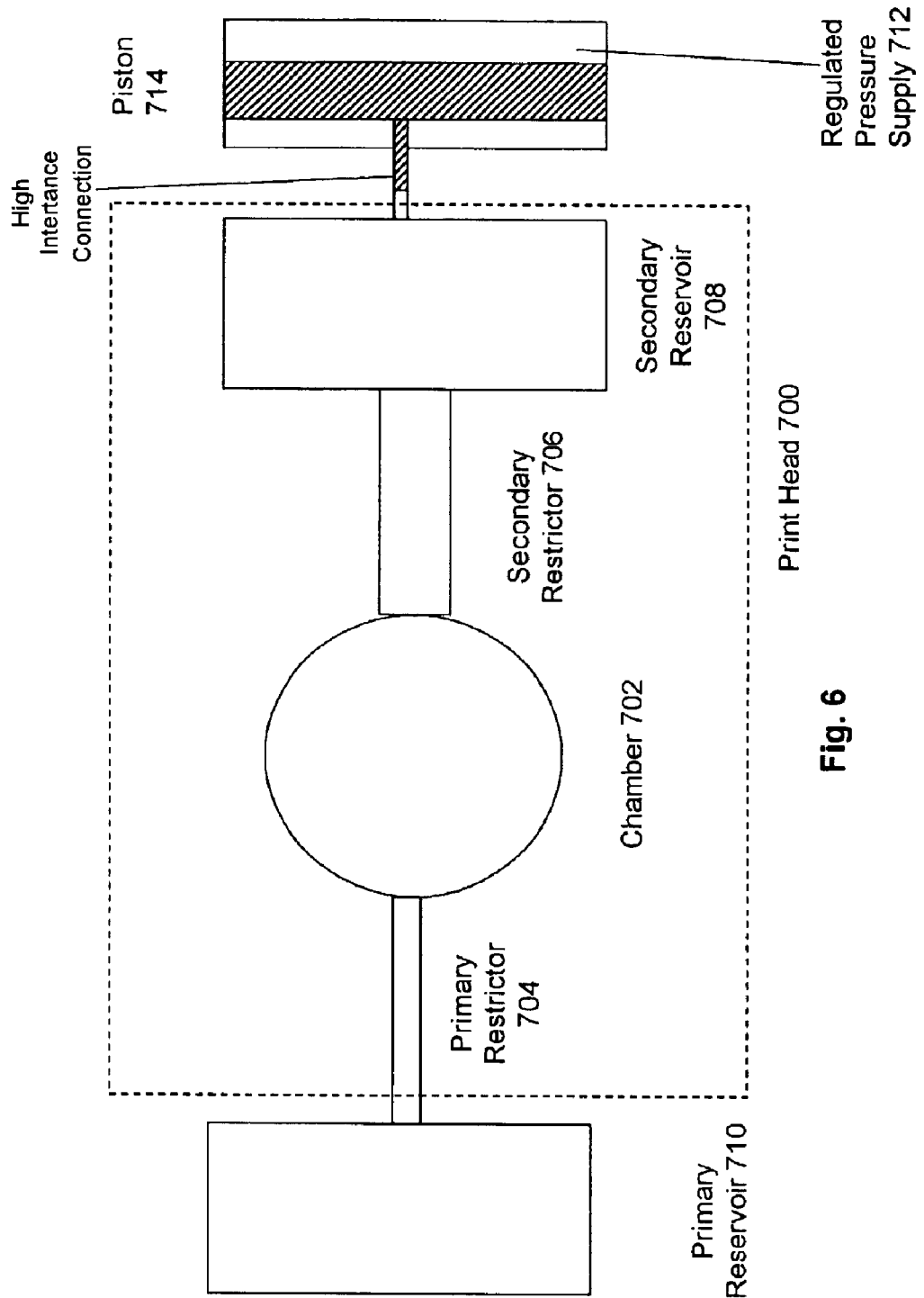
FIG. 6 illustrates an ink jet print head with a primary common reservoir and a secondary common reservoir according to an embodiment of the present invention.

FIG. 6 illustrates an ink jet print head with a primary common reservoir and a secondary common reservoir according to an embodiment of the present invention. When constructed, the print head 700 forms a plurality of ink jet devices, with each ink jet device having an orifice (not shown), an ink jet chamber 702, a primary restrictor 704, a secondary restrictor 706, a diaphragm (not shown), and a transducer (not shown). A primary common reservoir and a secondary common reservoir may be utilized by all of the plurality of ink jet devices. In other embodiments of the present invention, the print head 700 may include a single orifice, a single ink jet chamber 702, a single primary restrictor 704, a single secondary restrictor 706, a single secondary common reservoir 708, a single diaphragm, and a single transducer. In embodiments of the invention including a plurality of ink jet devices, the ink jet print head 700 may also include a primary common reservoir 710. As noted previously, each of the plurality of ink jet devices in the ink jet print head 700 operates to selectively eject droplets of ink from the ink jet chamber 702 through the ink droplet ejection orifice, in response to the selective energization of the transducer.

In this embodiment of the invention, the ink jet chamber 702 may receive ink from a secondary common reservoir 708 through the secondary restrictor 706 along with receiving ink from the primary common reservoir 710 through the first restrictor 704. The primary common reservoir 710 may be a large container maintained at/open to an ambient atmospheric pressure. The goal of this embodiment of the invention is to keep the pressure of the ink in the ink jet chamber 702 at a constant, somewhat higher than normal pressure level, during time periods when the transducer is firing in order to eliminate starvation. The secondary common reservoir 708 may be kept at a constant pressure almost equal to the pressure of the ink in the ink jet chamber 702. It may be at a very slightly higher pressure because of the pressure drop due to the ink flow through the secondary restrictor 706. By making the resistance of the secondary restrictor 706 relatively small, the pressure difference can be made negligibly small. The secondary common reservoir 708 may be made relatively as small with rigid walls so that the secondary common reservoir's 708 compliance is small.

It may be kept at a constant pressure by a movable, massive, rigid wall, such as a piston 714, and a regulated pressure supply 712. A relatively massive movable wall or massive piston 714 may add equivalent fluidic inertance between the secondary common reservoir 708 and the regulated pressure supply 712. In an embodiment of the present invention, the regulated pressure supply 712 may be part of the print head 700. In other embodiments of the present invention, the regulated pressure supply 712 may not be part of the print head.

The secondary common reservoir 708 may supply a large portion of the ink required by the ink jet chamber 702. At higher transducer firing frequencies, the pressure drop, i.e., pressure drop is equal to flow rate times resistance, across the secondary restrictor 706 may be much smaller than the pressure drop across the primary restrictor 704 because the resistance in the secondary restrictor 706 may be much smaller than the resistance in the primary restrictor 704.

The secondary restrictor 706 may have a very low resistance but a very high inertance. This configuration may be required so that the secondary reservoir 708 and the secondary restrictor 706 have a high impedance to rapid pressure fluctuations in the ink jet chamber 702, which occur when the transducer is fired. To further increase the impedance to rapid pressure fluctuations, the compliance of the secondary restrictor 706 may be made to be small. In other words, the ink within the secondary reservoir 708 may move through the secondary restrictor 706 very easily under the influence of a steady pressure but may not move very easily in response to rapid pressure fluctuations because of the high inertance of the secondary restrictor 706 and the small compliance of the secondary reservoir 708. Additionally, the high equivalent fluidic inertance between the secondary reservoir 708 and the regulated pressure supply 712, may serve to isolate the secondary reservoir 708 from any high compliance of the regulated pressure supply 712. Illustratively, the secondary reservoir 708 and the secondary restrictor 706 may look like a high impedance path to the rapid fluctuations. Most of the flow resulting from rapid pressure fluctuations occurs through the primary restrictor 704 and is controlled essentially by the primary restrictor 704 and the high compliance of the primary reservoir 710.

The secondary restrictor 706 may have a cross-sectional shape, which has a low resistance and a high inertance. In an exemplary embodiment of the present invention, the second restrictor 706 may be of a circular cross-sectional shape. In embodiments of the invention, more inertance may be desirable and the second common reservoir 708 may be established as a pressure regulated reservoir with a small compliance. A regulated pressure supply 712 may be used to hold the pressure in the chamber 702 at an almost constant value for steady or low frequency pressure fluctuations. High frequency pressure changes may occur within the ink jet chamber 702 and may be controlled primarily by the compliance of the ink jet chamber 702, the resistance and inertance of the primary restrictor 704, and the very large compliance of the primary reservoir 710. The high frequency pressure fluctuations may occur in a time of about one to twenty microseconds. Large pressure variations may occur in this time scale in the ink jet chamber 702. Slower changes occurring in times of greater than two to twenty milliseconds may be absorbed by the slow responding regulated pressure supply 712. In embodiments of the invention, walls of the secondary reservoir 708 which are not in pressure communication with the regulated pressure supply 712 may need to be rigid. In embodiments of the invention, the secondary reservoir 708 may need to be small. In this embodiment of the invention, a relatively massive flexible wall of the secondary reservoir 708 may be used for pressure communication between the regulated pressure supply 712 and the secondary reservoir 708. In embodiments of the invention, a massive piston 714 may be used for pressure communication between the regulated pressure supply 712 and the secondary reservoir 708.

In another embodiment of the present invention, the primary restrictor 704 resistance may be increased to above current levels to improve the damping of the meniscus. Ink that is consumed by the jetting process may come almost entirely from the secondary common reservoir 708. It may even be desirable to hold the primary reservoir 710 at a pressure very slightly lower than that of the secondary reservoir 708. In this case, a steady flow of ink may occur from the secondary common reservoir 708 to the first common reservoir 710 even when no jetting is taking place. An ink return device (not shown) may need to transfer the ink from the first common reservoir 710 to the second common reservoir 708.

While the description above refers to particular embodiments of the present invention, it should be readily apparent to people of ordinary skill in the art that a number of modifications may be made without departing from the spirit thereof The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. An ink-jet print head, comprising:
   a local reservoir to receive ink from a primary common reservoir, wherein the primary common reservoir keeps the ink at a high hydrostatic pressure;
   a restrictor passage to receive the ink from the local reservoir to and transfer the ink;
   an ink let chamber to receive the ink from restrictor passoge, said ink let chamber inclding an ink droplet ejection orifice;
   an election device to elect the ink through the ink droplet ejection orifice;
   and a pressure sensor located in the ink jet chamber to measure pressure within the ink jet chamber during firing of the election device and to transmit a signal.

2. The ink jet print head of claim 1, further including a controller to receive the signal from the pressure sensor and to transmit a valve signal.

3. The ink jet print head of claim 2, further including a valve to allow an increase hydrostatic pressure in the local reservoir, wherein the valve receives the valve signal from the controller and the valve opens during rapid firing of the ejection device during printer operation.

4. The ink jet print head of claim 3, further including a bleed valve coupled to the controller to dissipate pressure from the local reservoir and ink jet chamber, wherein the bleed valve receives the valve signal from the controller and the bleed valve opens when the pressure in the ink jet chamber is too high.

5. The ink jet print head of claim 4, wherein excess pressure dissipated by the bleed valve is transferred to the primary common reservoir.

6. The ink jet print head of claim 4, wherein the valve and the bleed valve are located in one physical valve device.

7. The ink jet print head of claim 1, wherein the primary common reservoir is kept at the high hydrostatic pressure by applying air above the ink by a pressure applying device.

8. The ink jet print head of claim 1, further including a pressure sensor to measure pressure in the local reservoir and a transducer firing rate determiner to identify a firing rate of the transducer, wherein the pressure sensor outputs a signal and the transducer firing determiner outputs a rate signal.

9. The ink jet print head of claim 8, further including a controller to receive the signal from the pressure sensor and the rate signal from the transducer firing rate determiner, to compute the pressure in the ink jet chamber, and to output a valve signal to a valve to open if the pressure is low in the ink jet chamber.

10. The ink jet print head of claim 8, further including a controller to receive the signal from the pressure sensor and the rate signal from the transducer firing rate determiner, to compute the pressure in the ink jet chamber, and to output a valve signal to a bleed valve to open if the pressure is high in the ink jet chamber.

11. The ink jet print head of claim 1, further including:
a controller to receive the signal and to transmit a displacement signal, and
a displacement device to receive the displacement signal and to displace the local reservoir in or out via a diaphragm to increase or reduce pressure in the local reservoir.

12. The ink jet print head of claim 11, where the displacement device is one of a piezo-electric operated pump, a piezo-electric bender, and a bubble chamber.

13. The ink jet print head of claim 1, further including:
a second pressure sensor in the local reservoir to measure pressure in the local reservoir and to transmit a signal;
a transducer firing rate determiner to identify a rate at which the transducer is firing and to transmit a rate signal;
a controller to receive the signal from the second pressure sensor and the rate signal from the transducer firing rate determiner, and to transmit a displacement signal; and
a displacement device to receive the displacement signal and to displace the local reservoir in or out, via a diaphragm, to increase or reduce the pressure in the local reservoir.

14. A method to prevent ink starvation in an ink jet print head, comprising:
keeping ink in a primary common reservoir at a high pressure;
detecting, by a pressure sensor in an ink let chamber, a drop in pressure in the ink let chamber; and
transferring the ink from the primary common reservoir to a local reservoir and the ink let chamber in response to the drop in pressure in the ink jet chamber.

15. The method of claim 14, wherein the transferring ink from the primary common reservoir includes opening a valve between the primary common reservoir and the local reservoir.

16. The method of claim 15, further including transferring ink from the local reservoir through the restrictor to the ink jet chamber to prevent starvation.

17. The method of claim 16, wherein the opening of the valve is based on a pressure reading from a pressure sensor.

18. The method of claim 17, further including dissipating pressure in the ink jet chamber by opening a bleed valve.

19. The method of claim 18, wherein dissipating pressure in the ink jet chamber is based on a pressure reading from a pressure sensor.

20. The method of claim 14, wherein transferring ink from the primary common reservoir includes opening a check valve between the primary common reservoir and the local reservoir.

21. The method of claim 20, further including transferring ink from the local reservoir through the restrictor to an ink jet chamber.

22. The method of claim 21, wherein the pressure of the ink being transferred from the local reservoir through the restrictor to the ink jet channel is increased or decreased due to a displacement device displacing in or out of the local reservoir.

23. The method of claim 22, wherein the displacement in or out of the local reservoir is determined by a pressure sensor located within the ink jet chamber.

24. An ink jet print head, comprising:
an ink jet chamber to contain ink, the ink jet chamber including an ink droplet ejection orifice;
a restrictor to transfer the ink from a primary reservoir to the ink jet chamber;
a transducer to eject the ink from the ink jet chamber through the ink droplet ejection orifice; and
a micro-pump, vibrating a diaphragm against the restrictor during printing operations, to draw the ink from the primary reservoir into the ink jet chamber.

25. The ink jet print head of claim 24, wherein the micro-pump a micro-pump transducer to vibrate the diaphragm across the restrictor to draw the ink from the primary reservoir into the ink jet chamber.

26. The ink jet print head of claim 25, wherein the micro-pump is an acoustic pump, the acoustic pump including a piezo-electric transducer or transducer.

27. The ink jet print head of claim 24, further including a micro-pump driving device to transmit a signal to the micro-pump to activate the micro-pump.

28. The ink jet print head of claim 27, wherein the micro-pump driving device is a resistor-capacitor circuit.

29. The ink jet print head of claim 28, wherein the micro-pump driving device is a digital circuit.

30. A method to prevent ink starvation in an ink jet print head, comprising:
keeping ink in a primary reservoir; and
transferring the ink from the primary reservoir through a restrictor to an ink jet chamber by a micro-pump, including a micro-pump transducer, vibrating a diaphragm over the restrictor.

31. The method of claim 30, further including driving the micro-pump based on a firing rate of a transducer with a micro-pump driving device.

32. The method of claim 31, wherein the micro-pump is continuously activated and a magnitude of a micro-pump pumping action is varied depending on the firing rate of the transducer.

33. An ink jet printing apparatus, comprising:
a paper feed device to feed paper within the ink jet printing apparatus; and
an ink jet print head, including
an ink jet chamber to contain ink, said ink jet chamber including an ink droplet ejection orifice,
a primary restrictor to transfer the ink from a primary reservoir to the ink jet chamber,
a transducer to eject the ink from the ink jet chamber through the ink droplet ejection orifice, and
a micro-pump, including a micro-pump transducer, to vibrate a diaphragm across the restrictor to draw the ink from the primary reservoir into the ink jet chamber.

34. The ink jet printing apparatus of claim 33, further including a micro-pump driving device to transmit a signal to the micro-pump to activate the micro-pump.

35. An ink-jet print head, comprising:
an ink jet chamber to contain ink, said ink jet chamber including an ink droplet ejection orifice;
a secondary common reservoir having a low compliance to contain the ink at a slightly higher pressure than pressure of the ink in the ink jet chamber when jetting is taking place;

a primary restrictor to transfer the ink between a primary common reservoir and the ink jet chamber; and a secondary restrictor to transfer ink from the secondary common reservoir to the ink jet chamber, wherein the secondary restrictor has a low resistance and a high inertance.

36. The ink jet print head of claim 35, wherein the secondary restrictor is of a circular cross-sectional shape.

37. The ink jet print head of claim 35, further including a regulated pressure supply to hold constant the pressure of the secondary common reservoir to keep the compliance of the secondary common reservoir to enable the secondary common reservoir to respond to slow variations in the pressure in the ink jet chamber due to rapid firing of a transducer.

38. The ink jet print head of claim 35, wherein the secondary common reservoir is small in size.

39. The ink jet print head of claim 35, wherein walls of the secondary common reservoir are rigid.

40. The ink jet print head of claim 35, wherein a connection between the secondary common reservoir and the regulated pressure supply is a high inertance path.

41. A method to prevent ink starvation, comprising:

storing ink in a primary common reservoir and a secondary common reservoir;

transferring the ink from a secondary common reservoir through a secondary restrictor to an ink jet chamber, wherein the secondary restrictor is low in resistance and high in inertance.

42. The method of claim 41, further including maintaining a higher ink pressure in the secondary common reservoir as compared to a primary ink pressure in the primary common reservoir.

43. The method of claim 42, wherein a regulated pressure supply maintains the higher ink pressure in the secondary common reservoir.

44. An ink jet printing apparatus, comprising:

a paper feed device to feed paper within the ink jet printing apparatus; and an ink jet print head, including an ink jet chamber to contain ink, said ink jet chamber including an ink droplet ejection orifice, wherein a transducer ejects ink droplets out of the ink droplet ejection orifice and onto the paper within the ink jet printing apparatus, a secondary common reservoir having a low compliance to contain the ink at a slightly higher pressure than pressure of the ink in the ink jet chamber when jetting is taking place, a primary restrictor to transfer ink between a primary common reservoir and the ink jet chamber, and a secondary restrictor to transfer ink from the secondary common reservoir to the ink jet chamber, wherein the secondary restrictor has a low resistance and a high inertance.

45. The ink jet printing apparatus of claim 44, further including a regulated pressure supply connected by a high inertance path to the secondary common reservoir to enable the secondary common reservoir to respond to slow variations in pressure in the ink jet chamber due to rapid firing of the transducer and not to respond to fast variations in pressure, the fast pressure utilized to eject the ink droplets.

46. The ink jet printing apparatus of claim 44, wherein the secondary restrictor is of a circular cross-sectional shape.

47. An ink-jet punt head, comprising:

a single local reservoir, coupled to a primary common reservoir, to receive ink from the primary common reservoir, wherein the primary common reservoir keeps the ink at a high hydrostatic pressure;

a single restrictor passage, coupled to the single local reservoir, to receive the ink from the single local reservoir and to transfer the ink;

a single ink jet chamber to receive the ink from the single restrictor passage, said single ink jet chamber including a single ink droplet ejection orifice;

a single ejection device to eject the ink through the single ink droplet ejection orifice;

and a single pressure sensor located in the ink jet chamber to measure pressure within the single ink jet chamber during firing of the single ink droplet ejection device and to transmit a signal.

48. An ink-jet print head, comprising:

a plurality of local reservoirs, said plurality of local reservoirs coupled to a primary common reservoir, to receive ink from the primary common reservoir, wherein the primary common reservoir keeps the ink at a high hydrostatic pressure;

a plurality of restrictor passages, said plurality of restrictor passages coupled to said plurality of local reservoirs, each restrictor passage receiving the ink from said corresponding local reservoir and transferring the ink;

a plurality of ink jet chambers coupled to the plurality of restrictor passages, each of said plurality of ink jet chambers to receive the ink from the corresponding restrictor passage, and each of said plurality of ink jet chambers including a ink droplet ejection orifice;

a plurality of ejection devices to eject the ink through the corresponding plurality of ink droplet ejection orifices; and a plurality of sensors correspondingly located in the plurality of the ink jet chambers to measure pressure within the plurality of ink jet chambers during firing of the plurality of ejection devices, each of said plurality of sensors transmitting a signal.

* * * * *